United States Patent Office 3,243,389
Patented Mar. 29, 1966

3,243,389
METHOD FOR MAKING POLYURETHANE PLASTICS USING AMINOURETHANE AND AMINOUREA CATALYSTS
Friedrich Möller, Leverkusen, and Wilhelm Thoma and Günther Braun, Cologne-Flittard, Germany, assignors to Farbenfabriken Bayer Aktiengesellschaft, Leverkusen, Germany, a German corporation
No Drawing. Filed June 14, 1963, Ser. No. 287,747
Claims priority, application Germany, June 19, 1962, F 37,105
4 Claims. (Cl. 260—2.5)

The present invention relates to polyurethane plastics and, more particularly, to a method for catalyzing the reaction between an organic isocyanate and an organic compound containing an active hydrogen containing group.

Plastic materials containing urethane groups and having a wide range of different physical properties have for a long time been produced on an industrial scale from compounds having active hydrogen atoms, such as those containing hydroxyl and/or carboxyl groups, and polyisocyanates, and if desired in the presence of water, activators, emulsifiers and other additives (Angew. Chem. A 59 (1948) 257; pocket book "Bayer-Kunststoffe" 1955).

Foam materials based on polyisocyanates can be advantageously prepared by mixing the liquid components thereof together either simultaneously or alternatively. An initial adduct containing —NCO groups may be first prepared from a polyhydroxyl compound with an excess of polyisocyanate and this adduct may then be converted with water, in a second working step, into the foam material. By the method of procedure and by the suitable choice of components it is possible to produce both elastic and rigid foam materials and all the modifications between these two extremes.

The choice of a catalyst for use in the reaction between the organic isocyanate and the organic compound or compounds containing active hydrogen containing groups is important. The catalyst must accelerate both the reaction between the active hydrogen containing groups and the isocyanate groups and the reaction between the water and the isocyanate groups. Also, in the single-stage process, the various simultaneously proceeding reactions should be matched to one another. Additional cross-linking reactions, probably with the formation of biuret structures and cyanuric acid rings can also take place. Since all these reactions start immediately on combining the components, care must be taken to provide for a control and matching of the progress of the separate reactions so that a material which is acceptable for industrial use is formed. This applies especially to short mixing and reaction times which are usually practiced when polyurethane materials are produced on a large industrial scale.

Tertiary amines have been found to be suitable as catalysts for the reactions that take place during the preparation of a polyurethane. However, most of the tertiary amines heretofore available have been found to be objectionable because they have an undesirable odor which remains with the polyurethane for an extended period of time after its formation. Tertiary amines also have not been entirely suitable for catalysis of reactions of some compounds having reactive hydrogen atoms with isocyanate groups either because of the odor or because they do not accelerate the reaction sufficiently to be adaptable to large scale production.

Therefore, it is an object of this invention to provide an improved method for making polyurethane plastics. It is another object of this invention to provide an improved catalyst for reactions between reactive hydrogen atoms and isocyanate groups. It is still another object of this invention to provide improved and odorless polyurethanes. It is a further object of this invention to provide a process for preparing improved polyurethane foams without imparting an objectionable odor to the foam. It is a further object of this invention to provide an improved catalytic system for use in the preparation of polyurethanes wherein the reactions between the components thereof are controlled.

The foregoing objects and others are accomplished in accordance with this invention, generally speaking, by providing a method for catalyzing the reaction between an organic compound containing active hydrogen atoms which are reactive with an organic isocyanate and an organic isocyanate with a catalytic amount of an aminourethane and/or an aminourea. The aminourethane and/or aminourea catalysts contemplated by this invention correspond to the following general formula:

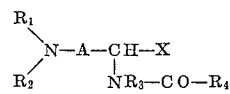

wherein:

A represents a divalent aliphatic radical having from about 1 to about 20 carbon atoms and preferably from about 1 to about 5 carbon atoms;

X represents hydrogen or a monovalent aliphatic radical having from about 1 to about 20 carbon atoms and preferably from about 1 to about 3 carbon atoms;

$R_1$ and $R_2$ represent alkyl, hydroalkyl and alkoxyalkyl radicals or atomic groups which form a heterocyclic ring together with the nitrogen atom;

$R_3$ represents hydrogen or alkyl or tertiary aminoalkyl radicals;

$R_4$ represents —$OR_5$ or —NH—$R_5$; wherein $R_5$ represents an alkyl, cycloalkyl, aralkyl or aryl radical.

It has been found that the catalysts according to the present invention are desirable accelerators for the various reactions which take place during the foaming process and coordinate the reactive velocities of the various reactions to one another. The foam materials obtained are characterized, in the case of soft foams, by a particularly good tensile strength with simultaneously a high degree of softness, while the hard foams are characterized by a high compressive strength. One particular advantage of these catalysts lies in the fact that the foam materials which are obtained are completely odorless and do not have the otherwise characteristic odor associated with a tertiary amine catalyst. The complete freedom from odor results from the low volatility of the catalyst being used and by the possible chemical incorporation of the catalysts into the foam material through allophanate or biuret linkage, which is made possible by the action of the polyisocyanate on the urethane or urea group of the catalyst. The invention thus contemplates in its broadest aspect the acceleration of any chemical reaction between a reactive hydrogen atom and an isocyanate group and in particular contemplates the preparation of polyurethane foam plastics while using catalysts having the above formula.

Any compound having the general formula given above may be used in accordance with this invention. A in the formula may be methylene, ethylene, propylene, butylene, amylene, nonylene, pentadecylene and the like. X can be hydrogen or a monovalent aliphatic radical such as, for example, methyl, ethyl, n-propyl, iso-propyl, n-butyl and the like. $R_1$ and $R_2$ may be any alkyl, hydroalkyl or alkoxyalkyl radical, or they may be any other atomic group which will form a heterocyclic ring together with the nitrogen atom. Examples of suitable alkyl, hydroalkyl and alkoxyalkyl radicals are for example, methyl, ethyl, n-propyl, iso-propyl, n-butyl, octyl, hexyl, heptyl, hydromethyl, hydroethyl, hydropropyl, hydroiso-propyl, hydrobutyl, methoxy-methyl, methoxy-ethyl, ethoxy-ethyl, propoxy-methyl, propoxy-ethyl and the like. $R_3$ can be those alkyl radicals already mentioned hereinbefore or tertiary aminoalkyl radicals such as, for example, dimethylaminomethyl, dimethylaminoethyl, diethylaminomethyl, diethylaminoethyl and the like. $R_5$ can be any suitable alkyl, cycloalkyl, aralkyl or aryl radical. Suitable alkyl radicals include for example, methyl, ethyl, n-propyl, iso-propyl, n-butyl and various positional isomers thereof such as, for example, 1-methylbutyl, 2-methylbutyl, 3-methylbutyl, 1,1-dimethylpropyl, 1,2-dimethylpropyl, 1-ethylpropyl, and the corresponding straight and branched chain isomers of hexyl, heptyl, octyl, nonyl, decyl, undecyl, dodecyl, tridecyl, tetradecyl, pentadecyl and the like. Suitable cycloalkyl radicals can be used such as, for example, cyclopropyl, cyclobutyl, cycloamyl, cyclohexyl, cycloheptyl, cyclooctyl and the like. Any suitable aralkyl radical can be used, such as, for example, α-phenyl-ethyl, β-phenyl-ethyl, α-phenyl-propyl, β-phenyl-propyl, gamma-phenyl-propyl, α-phenyl-isopropyl, α-phenyl-butyl, β-phenyl-butyl and the like, and the corresponding naphthyl derivatives. Suitable aryl radicals, such as, for example, phenyl, α-naphthyl, β-naphthyl, α-anthryl, β-anthryl, gamma-anthryl and the like can be used. Any suitable compound within the formula set forth may be used, such as, for example, 1-dimethylaminopropane-3-carbamic acid methyl ester, 1-dimethylaminopropane-3-carbamic acid ethyl ester, 1-dimethylaminopropane-3-carbamic acid iso-propyl ester, 1-dimethylaminopropane-3-carbamic acid n-propyl ester, 1-dimethylaminopropane-3-carbamic acid n-butyl ester, 1-dimethylaminopropane-3-carbamic acid stearyl ester, 1-diethylaminopropane-3-carbamic acid ethyl ester, 1-diethylaminopentane-4-carbamic acid ethyl ester, 1-methyl-β-hydroxyethylaminopropane-3-carbamic acid ethyl ester, 1-pyrrolidinopropane-3-carbamic acid methyl ester, 1-pyrrolidinopropane-3-carbamic acid ethyl ester, N,N-bis-(1-dimethylaminopropane-3)-carbamic acid methyl ester, N-(1-dimethylaminopropane-3)-N'-cyclohexyl urea, N-(1-methyl-β-hydroxyaminopropane-3)-N' - phenyl urea, -N'-u-chlorohexyl urea and -N'-benzyl urea.

The invention broadly contemplates any catalytic amount of the catalyst but ordinarily from about 0.01 percent to about 5 percent and preferably from about 0.1 percent to about 1 percent by weight based on the reaction mixture should be used for best results.

The catalysts to be used according to the invention are prepared by known methods by reacting primary or secondary amines containing tertiary amino groups with chloroformic acid esters and alkali preferably with pyrocarbonic acid esters, alcohol and carbon dioxide being split off, or by reaction with isocyanates.

By "organic compound containing active hydrogen atoms which are reactive with an organic isocyanate" as used herein is meant any organic compound having at least one hydrogen atom determinable by the Zerewitinoff method. This method is described by Kohler et al., J. Am. Chem. Soc. 49, 3181 (1927). Such hydrogen atoms are reactive with isocyanate groups. Preferably, the reactive hydrogen atom is contained in an hydroxyl group but it can also be contained in a primary amino group, a carboxyl group, a urethane or urea group or any other group adapted to react with an isocyanate group. The reaction product of an amine and an isocyanate is a urea. The reaction of a carboxyl group and an isocyanate group produces an amide and the reaction of an hydroxyl group and an isocyanate produces a urethane.

Any suitable organic compound containing active hydrogen atoms as defined herein may be used. Examples of such compounds include monohydric alcohols, polyhydric alcohols, urethanes, mercaptans, ureas, carboxylic acids, amines and the like. More specifically, the compound may be ethyl alcohol, methyl alcohol, propyl alcohol, isopropyl alcohol, butyl alcohol, amyl alcohol, octadecyl alcohol, benzyl alcohol, benzoic acid, benzylamine, acetic acid, adipic acid, hydroxy-adipic acid, ethylene glycol, thiodiglycol, diethylene glycol, propylene glycol, tetramethylene glycol, octadecyl glycol, terephthalic acid, ethylene diamine, phthalic acid, glycine, glycerine, trimethylol propane, sorbitol, ethanolamine, succinic acid, maleic acid, tartaric acid, citric acid or the like. In preparing a polyurethane, the organic compound having reactive hydrogen has at least two reactive hydrogen atoms and may be a linear or branched polyester, a polyhydric polyalkylene ether, a polyhydric polythioether, a polyesteramide, a polyacetal, the polymer of carbon monoxide and an olefine or the like. The polyester may be prepared by condensing any suitable polyhydric alcohol with any suitable polycarboxylic acid. The polycarboxylic acid may be either aromatic or aliphatic. Any suitable polycarboxylic acid may be used, such as, for example, adipic acid, succinic acid, phthalic anhydride, terephthalic acid, maleic acid, malonic acid and the like including those disclosed in U.S. Patent Reissue 24,514. Any suitable polyhydric alcohol may be used, such as, for example, ethylene glycol, diethylene glycol, hexanetriol, glycerine, butanediol, trimethylolpropane, and the like including those disclosed in U.S. Patent Reissue 24,514.

The polyhydric polyalkylene ether may be prepared by condensing an alkylene oxide or by condensing an alkylene oxide with a polyhydric alcohol. Any suitable alkylene oxide may be used, such as, for example, ethylene oxide, propylene oxide, 1,2- and 2,3-butylene oxide, styrene oxide, epichlorohydrin, tetrahydrofuran, and preferably those having a hydroxyl group content of from about 0.5 to about 15 percent and the like. Any suitable polyhydric alcohol may be used, such as, for example, ethylene glycol, diethylene glycol, glycerine, pentaerythritol, hexanetriol, trimethylolpropane and the like. It is preferred to use a lower alkylene oxide having up to five carbon atoms. If desired, the polyhydric polyalkylene ether can be prepared from two or more alkylene oxides, such as, for example, ethylene and propylene oxides. These polyalkylene glycol ethers can also be employed in admixture with other polyvalent hydroxyl compounds such as butylene-1,4-glycol, trimethylolpropane, pentaerythritol, tartaric acid esters and castor oil. Foaming with polyalkylene glycol ethers can also be effected in admixture with polyesters.

The polythioether may be prepared by any suitable process, such as, for example, by condensing thiodiglycol. Methods for making suitable polythioethers are disclosed in U.S. Patents 2,862,972 and 2,900,368.

An amino alcohol, such as ethanolamine, diethanolamine, triethanolamine, aniline and alkylene diamines, such as, for example, ethylene diamine, tetramethylenediamine, and hexamethyldiamine, can be included in the preparation of the polyester in order to produce a polyesteramide suitable for use in this invention. For example, a polyesteramide prepared from ethylene glycol, ethanolamine and adipic acid may be used. The polyester amide can also contain heteroatoms, double and triple bonds, and modifying radicals of saturated or unsaturated fatty acids or fatty alcohols.

The polyacetal may be prepared by any suitable process such as, for example, by condensing an aldehyde, such as, formaldehyde with a polyhydric alcohol, such as ethylene glycol, 1,2-propylene glycol, trimethylolpropane, butane-1,2,4-triol, glycerine, castor oil, or one of the other polyhydric alcohols disclosed above for making polyesters.

The copolymer of carbon monoxide and an olefine may be one of those disclosed in U.S. Patent 2,839,478, such as, for example, an ethylene-propylene-carbon monoxide copolymer, hydrogenation products or ethylene olefine carbon monoxide copolymers and the like.

Oxide-phenol reaction products, formaldehyde resins, and epoxy resins may also be mentioned as examples of suitable polyhydroxy compounds.

Any suitable organic isocyanate, aromatic, aliphatic or heterocyclic isocyanate may be used in the reaction in accordance with this invention such as, for example, ethylene diisocyanate, ethylidine diisocyanate, 1,4-butylene diisocyanate, 1,6-hexamethylene diisocyanate, m-xylylene diisocyanate, p-xylylene diisocyanate, 4,4-dimethyl-1,3-xylylene diisocyanate, cyclohexane-1,4-diisocyanate, dicyclohexylmethane-4,4'-diisocyanate, m-phenylene diisocyanate, p-phenylene diisocyanate, 1-alkylbenzene-2,4-diisocyanate such as, for example, 2,4-toluylene diisocyanate, 3-(α-isocyanatoethyl)phenyl isocyanate, 1-alkylbenzene-2,6-diisocyanates, such as, for example, 2,6-toluylene diisocyanate, 2,6-diethylbenzene-1,4-diisocyanate, diphenylmethane-4,4'-diisocyanate, diphenyldimethylmethane-4,4'-diisocyanate, 3,3'-dimethoxydiphenylmethane-4,4'-diisocyanate, naphthylene-1,5-diisocyanate, 2,2-diphenylpropane-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, and the like. Trifunctional and polyfunctional polyisocyanates can also be used at the same time for example, toluene-2,4,6-triisocyanate, reaction products of for example, 1 mol of a trihydric alcohol with 3 mols of a diisocyanate, or those polyisocyanates which are used according to German patent specifications 1,022,789 and 1,027,394.

Unrefined isocyanates may also be used, such as, for example, the crude mixture of isocyanates obtained by the phosgenation of the reaction product of aniline and formaldehyde which contains a mixture of di- and higher polyisocyanates or by phosgenating a mixture of toluylene diamines which is primarily a mixture or ortho- and para-toluylene diamines. A preferred product is one having from about 26 to about 33 percent free —NCO and an amine equivalent of about 120 to about 150, such as, for example, a product having about 32 percent free —NCO and an amine equivalent of about 140.

In preparing a cellular polyurethane, it is desirable to include a foam stabilizer. Silicone compounds are preferred. For example, dimethyl siloxane or other lower alkyl siloxane can be used to advantage in many formulations, particularly if the organic compound having reactive hydrogens is a polyester. When polyhydric polyalkylene ethers are used as the resinous component, it is preferred to use a compound having the following formula with the catalyst provided by this invention:

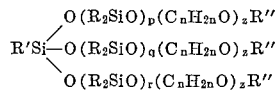

wherein R, R' and R" are alkyl radicals having 1 to 4 carbon atoms; $p$, $q$ and $r$ each have a value of from 4 to 8 and $(C_nH_{2n}O)_z$ is a mixed polyoxyethylene oxypropylene block containing from 15 to 19 oxyethylene units and from 11 to 15 oxypropylene units with $z$ equal to from about 26 to about 34 or similar stabilizer. Compounds represented by the formula and a method for making them are disclosed in U.S. Patent 2,834,748. This stabilizer can also be used with all of the other organic compounds having reactive hydrogens if desired.

One may also employ halo hydrocarbons either alone or with water in conjunction with the balance of the components of the cellular polyurethane plastic. Any suitable blowing agent such as, for example, dichlorodifluoromethane, trichlorofluoromethane, dichlorofluoromethane, dichlorotetrafluoroethane and the like may be used.

The actual production of the foam material is effected by the known method of procedure at room temperature or higher temperatures by simply mixing the components. For this purpose, it is advantageous to make use of mechanical arrangements such as those described, for example, in French Patent 1,074,713. Other additives, such as, for example, emulsifiers, such as, sulphonated catsor oil, stabilizers such as those mentioned hereinbefore, dyestuffs, flame-proofing agents and other activators such as, organic tin compounds, such as, for example, tin dioctoate, dibutyl tin dilaurate and the like may be added to the mixture to be foamed.

The cellular polyurethane foams produced in accordance with the present invention are particularly useful in the manufacture of furniture cushions, pillows, bedding, topper pads, both sound and heat insulations, such as, in curtain wall construction, and the like.

The invention is further illustrated by the following examples in which the parts are by weight unless otherwise specified.

*Example 1*

About 100 parts of a polyester of adipic acid and diethylene glycol slightly branched with trimethylol propane and having an hydroxyl number of about 60 are thoroughly mixed with about 0.7 part of 1-dimethylaminopropane-3-carbamic acid ethyl ester, about 1.5 parts of a non-ionic emulsifier based on oxydiphenyl and ethylene oxide, about 2 parts of sodium-castor oil sulfate (about 50% water), about 0.3 part of paraffin oil and about 2.1 parts of water. After adding about 49 parts of toluylene diisocyanate, the mixture starts to foam and an elastic foam material is obtained which has particularly good tensile strength, as shown by the following physical properties:

| | |
|---|---|
| Weight per unit volume, kg./m.³ | 26 |
| Tensile strength, kg./cm.² | 1.5 |
| Breaking elongation, % | 220 |
| Impact hardness (at 40% compression), g./cm.² | 40 |
| Rebound elasticity, % | 22 |
| Permanent deformation, % | 8 |

*Example 2*

About 100 parts of a polypropylene glycol slightly branched with trimethylolpropane and having a hydroxyl number of about 56 are thoroughly stirred with about 1 part of 1-dimethyl-aminopropane-3-carbamic acid ethyl ester, about 0.4 part of stannous octoate, about 1.5 parts of polysiloxane polyalkylene glycol ether and about 4 parts of water. After adding about 51 parts of toluylene diisocyanate, an elastic foam material is obtained which has particularly good supporting properties and which has the following mechanical properties:

| | |
|---|---|
| Weight per unit volume, kg./m.³ | 26 |
| Tensile strength, kg./cm.² | 1.1 |
| Breaking elongation, % | 215 |
| Impact hardness (at 40% compression), g./cm.² | 43 |
| Rebound elasticity, % | 37 |
| Permanent deformation, % | 8 |

*Example 3*

About 50 parts of a propoxylated trimethylolpropane with a hydroxyl number of about 380 are mixed with about 30 parts of a polyester prepared from adipic acid, phthalic acid anhydride, oleic acid and trimethylolpropane having an hydroxyl number of about 380 and about 20 parts of propoxylated ethylenediamine with an OH number of about 720. About 1 part of 1-dimethylaminopropane-3-carbamic acid ethyl ester and about 0.5 part of polysiloxane polyalkylene glycol ether are incorporated into this mixture as the activating component. After adding a solution of about 50 parts of trichloromonofluoromethane in about 110 parts of 4,4'-diphenylmethane diisocyanate (about 90%), the mixture starts to foam and a very tough hard foam is obtained with a high compressive strength and a low weight per unit volume, as shown from the following physical properties:

Weight per unit volume, kg./m.³ _____ 21
Compressive strength, kg./cm.² _____ 1.3
Impact toughness, kg./cm. _____ 0.3
Hot-bending strength, ° C. _____ 112
Water absorption, % _____ 2

*Example 4*

If 0.7 part of 1-methyl-β-hydroxyethylaminopropane-3-carbamic acid ethyl ester are used instead of the 1-dimethylamino-propane-3-carbamic acid ethyl ester in Example 1 a foam with similar properties as in Example 1 is obtained.

*Example 5*

If 0.7 part of N-(1-dimethylaminopropane-3)-N'-cyclohexyl urea are used instead of the 1-dimethyl-aminopropane-3-carbamic acid ethyl ester in Example 2 a foam with similar properties as in Example 2 is obtained.

It is to be understood that any of the other suitable organic isocyanates, blowing agents, organic compounds containing active hydrogen atoms which are reactive with organic isocyanates, catalysts, stabilizers and the like described herein can be substituted in the particular examples with satisfactory results providing the teachings of the preceding disclosure are followed.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

What is claimed is:

1. A method for the preparation of a polyurethane which comprises reacting an organic polyisocyanate with an organic compound containing active hydrogen atoms as determinable by the Zerewitinoff method in a reaction mixture containing a catalytic amount of a catalyst selected from the group consisting of aminourethanes and aminoureas, said catalyst having the structure

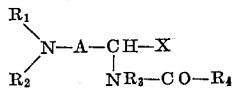

wherein A is a divalent aliphatic radical having from about 1 to about 20 carbon atoms; X is hydrogen or a monovalent aliphatic radical having from about 1 to about 20 carbon atoms; $R_1$ and $R_2$ are selected from the group consisting of alkyl, hydroxyalkyl, alkoxyalkyl and atomic groups which form a heterocyclic ring together with the nitrogen atom; $R_3$ is selected from the group consisting of hydrogen, alkyl and tertiary aminoalkyl radicals; $R_4$ is a member selected from the group consisting of —$OR_5$ and —NH—$R_5$ wherein $R_5$ is selected from the group consisting of alkyl, cycloalkyl, aralkyl and aryl radicals.

2. The methow of claim 1 wherein the catalyst is 1-dimethylaminopropane-3-carbamic acid ethyl ester.

3. A method for the preparation of a cellular polyurethane which comprises reacting an organic polyisocyanate with an organic compound containing active hydrogen atoms as determinable by the Zerewitinoff method and a blowing agent in a reaction mixture containing a catalytic amount of a catalyst selected from the group consisting of aminourethanes and aminoureas, said catalyst having the structure

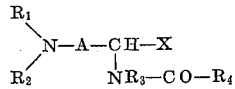

wherein A is a divalent aliphatic radical having from about 1 to about 20 carbon atoms; X is hydrogen or a monovalent aliphatic radical having from about 1 to about 20 carbon atoms; $R_1$ and $R_2$ are selected from the group consisting of alkyl, hydroxyalkyl, alkoxyalkyl and atomic groups which form a heterocyclic ring together with the nitrogen atom; $R_3$ is selected from the group consisting of hydrogen, alkyl and tertiary aminoalkyl radicals; $R_4$ is a member selected from the group consisting of —$OR_5$ and —NH—$R_5$ wherein $R_5$ is selected from the group consisting of alkyl, cycloalkyl, aralkyl and aryl radicals.

4. The method of claim 3 wherein the catalyst is 1-dimethylaminopropane-3-carbamic acid ethyl ester.

References Cited by the Examiner

UNITED STATES PATENTS

| | | | |
|---|---|---|---|
| 2,625,532 | 1/1953 | Seeger | 260—45.4 |
| 2,877,192 | 3/1959 | Burkus | 260—2.5 |
| 3,163,536 | 12/1964 | Nishio et al. | 260—482 |

FOREIGN PATENTS 1,100,272  2/1961  Germany.

OTHER REFERENCES

Chemical Abstracts, vol. 53, p. 583h, Jan. 10, 1959.

LEON J. BERCOVITZ, *Primary Examiner.*

DONALD E. CZAJA, *Examiner.*

FRED McKELVEY, *Assistant Examiner.*